United States Patent
Wang et al.

(10) Patent No.: US 12,430,612 B2
(45) Date of Patent: Sep. 30, 2025

(54) METHOD AND SYSTEM FOR INVENTORYING ITEMS, ROBOT CONTROL APPARATUS AND ROBOT

(71) Applicant: BEIJING JINGDONG QIANSHI TECHNOLOGY CO., LTD., Beijing (CN)

(72) Inventors: Hongwei Wang, Beijing (CN); Wenming Zhe, Beijing (CN); Yami Chen, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 163 days.

(21) Appl. No.: 18/257,055

(22) PCT Filed: Nov. 23, 2021

(86) PCT No.: PCT/CN2021/132338
§ 371 (c)(1),
(2) Date: Jun. 12, 2023

(87) PCT Pub. No.: WO2022/183782
PCT Pub. Date: Sep. 9, 2022

(65) Prior Publication Data
US 2024/0046202 A1 Feb. 8, 2024

(30) Foreign Application Priority Data
Mar. 3, 2021 (CN) .......................... 202110233756.0

(51) Int. Cl.
*G06Q 10/087* (2023.01)
*B65G 1/137* (2006.01)
(Continued)

(52) U.S. Cl.
CPC ......... *G06Q 10/087* (2013.01); *B65G 1/1371* (2013.01); *B65G 1/1373* (2013.01);
(Continued)

(58) Field of Classification Search
CPC .... G06Q 10/087; G06Q 10/08; B65G 1/1371; B65G 1/1373; B65G 2203/0283;
(Continued)

(56) References Cited

U.S. PATENT DOCUMENTS 9,129,251 B2 * 9/2015 Davidson ............. G06Q 10/087
11,003,869 B2 * 5/2021 Tomiyama ......... G06K 7/10376
(Continued)

FOREIGN PATENT DOCUMENTS

CN 1979519 A 6/2007
CN 205451167 U 8/2016
(Continued)

OTHER PUBLICATIONS

"First Office Action and English language translation", CN Application No. 202110233756.0, Jan. 4, 2022, 23 pp.
(Continued)

*Primary Examiner* — Michael Jared Walker
(74) *Attorney, Agent, or Firm* — Myers Bigel, P.A.

(57) ABSTRACT

The disclosure provides a method and a system for inventorying items, a robot control apparatus and a robot. The method including: transmitting a second signal with a first frequency through a first transmitting antenna in a case where a first signal with the first frequency is received; transmitting a fourth signal with a second frequency through a second transmitting antenna; taking one of a plurality of third signals, which has a maximum signal strength, as a target signal in a case where the plurality of the third signals are received; taking a storage-bin corresponding to a storage-bin electronic tag transmitting the target signal as a
(Continued)

target storage-bin, extracting item electronic tag information associated with the target storage-bin; acquiring a inventorying result of the target storage-bin according to a plurality of pieces of tag information and the item electronic tag information; and transmitting the inventorying result to the main controller.

17 Claims, 5 Drawing Sheets

(51) Int. Cl.
G05D 1/00 (2024.01)
G06T 7/70 (2017.01)
H04B 17/318 (2015.01)

(52) U.S. Cl.
CPC ............ G05D 1/0212 (2013.01); G06T 7/70 (2017.01); H04B 17/318 (2015.01); B65G 2203/0283 (2013.01); B65G 2203/046 (2013.01)

(58) Field of Classification Search
CPC ............ B65G 2203/046; G05D 1/0212; G06T 7/70; H04B 17/318; G06K 7/10356; G06K 17/0022; B25J 9/1679; B25J 9/1602
See application file for complete search history.

(56) References Cited

U.S. PATENT DOCUMENTS

2014/0247116 A1* 9/2014 Davidson ........... G06K 7/10297
901/1
2019/0087772 A1* 3/2019 Medina ................. G05D 1/106
2019/0352092 A1* 11/2019 Zheng ................. B65G 1/1375
2020/0130936 A1* 4/2020 Shekhawat ............ B25J 9/1664

FOREIGN PATENT DOCUMENTS

| | | | | |
|---|---|---|---|---|
| CN | 108764391 A | 11/2018 | | |
| CN | 108805508 A | * 11/2018 | ......... | G06K 17/0029 |
| CN | 109272080 A | 1/2019 | | |
| CN | 109934313 A | 6/2019 | | |
| CN | 110009076 A | 7/2019 | | |
| CN | 110322176 A | 10/2019 | | |
| CN | 110458256 A | 11/2019 | | |
| CN | 110587630 A | 12/2019 | | |
| CN | 110677174 A | 1/2020 | | |
| CN | 111620032 A | 9/2020 | | |
| CN | 111823236 A | 10/2020 | | |
| CN | 112975976 A | 6/2021 | | |
| KR | 20170094103 A | 8/2017 | | |
| WO | 2013071150 A1 | 5/2013 | | |

OTHER PUBLICATIONS

"International Search Report and English language translation", International Application No. PCT/CN2021/132338, Feb. 22, 2022, 7 pp.
"Second Office Action and English language translation", CN Application No. 202110233756.0, Jul. 15, 2022, 23 pp.
Bian, Li Hao , "Air Engineering Introduction (Chinese Edition)", Beijing Institute of Technology Press, Sep. 30, 2019, pp. 190-193.
Zhang, Tao , et al., "Introduction to Robot (Chinese Edition)", China Machine Press, 2020, 7 pp.

* cited by examiner

METHOD AND SYSTEM FOR INVENTORYING ITEMS, ROBOT CONTROL APPARATUS AND ROBOT

CROSS-REFERENCE TO RELATED APPLICATIONS

The present application is a U.S. National Stage Application under 35 U.S.C. § 371 of International Patent Application No. PCT/CN2021/132338, filed on Nov. 23, 2021, which itself is based on and claims priority from the application of CN application No. 202110233756.0 filed on Mar. 3, 2021, the disclosures of both of which are hereby incorporated herein by reference in their entireties.

TECHNICAL FIELD

The present disclosure relates to the field of information processing, and in particular, to a method and a system for inventorying items, a robot control apparatus, and a robot.

BACKGROUND

At present, the inventory is mainly performed manually during item inventorying. A staff reads an RFID (Radio Frequency Identification) electronic tag provided on an item using a PDA (Personal Digital Assistant), and compares tag data with electronic tag information of inventory items to realize item inventorying.

SUMMARY

According to a first aspect of the embodiments of the present disclosure, there is provided a method for inventorying items performed by a robot control apparatus, comprising: transmitting a second signal with a first frequency through a first transmitting antenna in a case where a first signal with the first frequency transmitted by a main controller is received through a receiving antenna during driving a robot to move along a preset path, to cause each of a plurality of storage-bin electronic tags receiving the second signal to transmit a third signal with the first frequency; transmitting a fourth signal with a second frequency through a second transmitting antenna, to cause each of a plurality of item electronic tags receiving the fourth signal to transmit a fifth signal with the second frequency; taking one of a plurality of third signals, which has a maximum signal strength, as a target signal in a case where the plurality of the third signals are received through the receiving antenna; taking a storage-bin corresponding to a storage-bin electronic tag transmitting the target signal as a target storage-bin, and extracting item electronic tag information associated with the target storage-bin from an information base; acquiring a inventorying result of the target storage-bin according to a plurality of pieces of tag information and the item electronic tag information in a case where the plurality of pieces of tag information transmitted by an electronic tag receiver are received, wherein the electronic tag receiver acquires the tag information from the fifth signal; and transmitting the inventorying result of the target storage-bin to the main controller.

In some embodiments, the method further comprising: acquiring first positioning information of the robot from the plurality of the third signals in a case where the plurality of third signals are received through the receiving antenna; acquiring second positioning information of the robot from a positioning device; determining current position information of the robot according to the first positioning information and the second positioning information; and transmitting the current position information to the main controller, to cause the main controller to detect whether the robot is on the preset path.

In some embodiments, the method further comprising: receiving position estimation information of the robot provided by an image processing device, wherein the image processing device collects images of the robot in a preset period, and analyzes the images to obtain the position estimation information; and the determining the current position information of the robot according to the first positioning information and the second positioning information comprises: determining the current position information of the robot according to the first positioning information, the second positioning information, and the position estimation information.

In some embodiments, the method further comprising: adjusting a motion state of the robot according to an adjustment instruction after receiving the adjustment instruction transmitted by the main controller, to cause the robot to be on the preset path.

In some embodiments, the method further comprising: detecting whether inventorying results of all storage-bins are obtained after transmitting the inventorying result of the target storage-bin to the main controller; driving the robot to move along the preset path in a case where the inventorying results of all the storage-bins are not obtained; and driving the robot back to a designated spot in a case where the inventorying results of all the storage-bins are obtained.

According to a second aspect of an embodiment of the present disclosure, there is provided a robot control apparatus, comprising: a first processing module, configured to transmit a second signal with a first frequency through a first transmitting antenna in a case where a first signal with the first frequency transmitted by a main controller is received through a receiving antenna during driving a robot to move along a preset path, to cause each of a plurality of storage-bin electronic tags receiving the second signal to transmit a third signal with the first frequency, and transmit a fourth signal with a second frequency through a second transmitting antenna, to cause each of a plurality of item electronic tags receiving the fourth signal to transmit a fifth signal with the second frequency; a second processing module, configured to take one of a plurality of third signals, which has a maximum signal strength, as a target signal in a case where the plurality of the third signals are received through the receiving antenna, take a storage-bin corresponding to a storage-bin electronic tag transmitting the target signal as a target storage-bin, and extract item electronic tag information associated with the target storage-bin from an information base; a third processing module, configured to acquire a inventorying result of the target storage-bin according to a plurality of pieces of tag information and the item electronic tag information in a case where the plurality of pieces of tag information transmitted by an electronic tag receiver are received, wherein the electronic tag receiver acquires the tag information from the fifth signal; and a fourth processing module, configured to transmit the inventorying result of the target storage-bin to the main controller.

According to a third aspect of the embodiments of the present disclosure, there is provided a robot control apparatus comprising: a memory; and a processor coupled to the memory, which is configured to execute the method for inventorying the items according to any one of the embodiments described above on a basis of instructions stored in the memory.

According to a fourth aspect of embodiments of the present disclosure, there is provided a robot, comprising: the robot control apparatus according to any one of the embodiments described above; a receiving antenna, configured to receive a first signal with a first frequency transmitted by a main controller, and receive a third signal with the first frequency transmitted by a storage-bin electronic tag; a first transmitting antenna, configured to transmit a second signal with the first frequency; and a second transmitting antenna, configured to transmit a fourth signal with a second frequency.

According to a fifth aspect of embodiments of the present disclosure, there is provided a system for inventorying items, comprising: the robot according to any one of the embodiments described above; a main controller, configured to continuously transmit a first signal with a first frequency and receive a inventorying result transmitted by the robot; a storage-bin electronic tag, configured to transmit a third signal with the first frequency in a case where a second signal with the first frequency is received; an item electronic tag, configured to transmit a fifth signal with a second frequency in a case where a fourth signal with the second frequency is received; and an electronic tag receiver, configured to receive a fifth signal with the second frequency, acquire tag information from the fifth signal, and transmit the tag information to the robot.

In some embodiments, the system further comprising: an image processing device, configured to acquire images of the robot in a preset period, acquire position estimation information of the robot by analyzing the images, and transmit the position estimation information to the robot.

In some embodiments, the main controller is further configured to detect whether the robot is on the preset path according to the position information transmitted by the robot, and transmit an adjustment instruction to the robot in a case where the robot is not on the preset path.

According to a sixth aspect of the embodiments of the present disclosure, there is provided a computer-readable storage medium that stores computer instructions which, when executed by a processor, implement the method according to any one of the embodiments described above.

Other features of the present disclosure and advantages thereof will become apparent from the following detailed description of exemplary embodiments thereof, which proceeds with reference to the following figures.

BRIEF DESCRIPTION OF THE DRAWINGS

The figures as needed in in the description of the embodiments or related art will be briefly described below. The present disclosure will be more clearly understood from the following detailed description, which proceeds with reference to the following figures.

It is apparent that the figures in the following description are merely examples of the disclosure and that other figures may be derived by those of ordinary skill in the art without paying inventive effort.

DETAILED DESCRIPTION

The technical solutions in the embodiments of the present disclosure in a clear and complete manner with reference to the figures in the embodiments of the present disclosure, and it is obvious that the embodiments described are only some, rather than all, of the embodiments of the present disclosure. The following description of at least one exemplary embodiment is merely illustrative in nature and is in no way intended to limit the disclosure, its application, or uses. All other embodiments, which can be derived by a person skilled in the art from the embodiments disclosed herein without paying inventive effort, are intended to be within the scope of the present disclosure.

The relative arrangement of parts and steps, numerical expressions and numerical values set forth in these embodiments do not limit the scope of the present disclosure unless specifically stated otherwise.

Meanwhile, it should be understood that the sizes of the respective portions shown in the figures are not drawn in an actual proportional relationship for the convenience of description.

Techniques, methods, and apparatus known to one of ordinary skill in the relevant art may not be discussed in detail but are intended to be part of the specification where appropriate.

In all examples shown and discussed herein, any particular value should be construed as exemplary only and not as limiting. Thus, other examples of the exemplary embodiments may have different values.

It should be noted that similar reference numbers and letters refer to similar items in the following figures, and thus, once an item is defined in one figure, it need not be discussed further in subsequent figures.

The inventors find that data errors are apt to occur when inventory is performed manually, the workload of manual inventory is heavy, and the working efficiency is low.

In view of the above, the present disclosure provides a solution for inventorying items, it can reduce the cost of the manual inventory, and improve the efficiency of the inventory.

Figure 1:
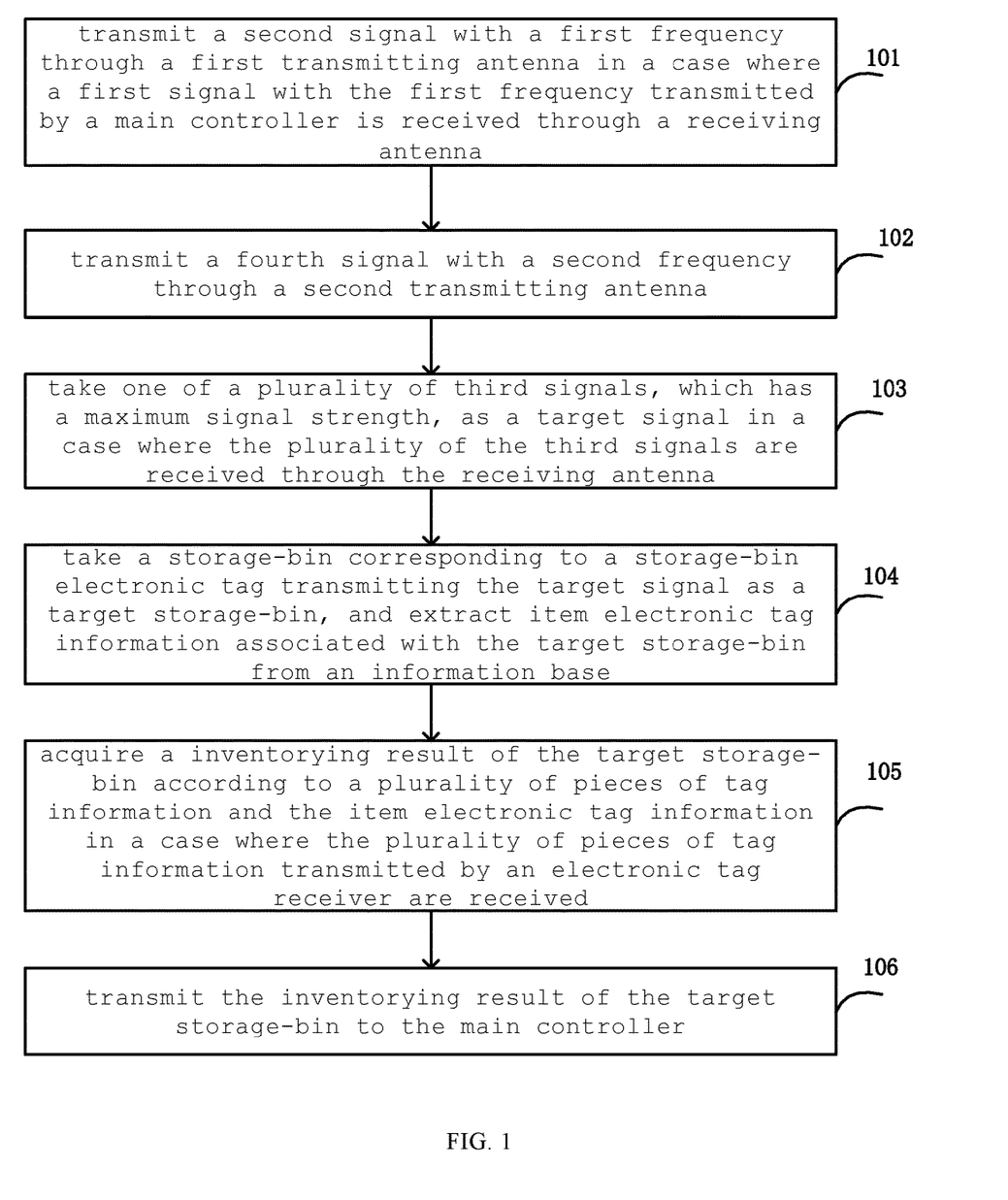
FIG. 1 is a schematic flowchart of a method for inventorying items according to one embodiment of the present disclosure.

FIG. 1 is a schematic flowchart of a method for inventorying items according to one embodiment of the present disclosure. In some embodiments, the following steps of the method for inventorying the items are executed by a robot control apparatus of a robot.

In step 101, a second signal with a first frequency is transmitted through a first transmitting antenna in a case where a first signal with the first frequency transmitted by a main controller is received through a receiving antenna during driving a robot to move along a preset path, to cause each of a plurality of storage-bin electronic tags receiving the second signal to transmit a third signal with the first frequency.

In some embodiments, the main controller continuously transmits a first signal with a first frequency. For example, the first frequency is 433 MHz.

Each storage-bin is provided with a storage-bin electronic tag, and a working frequency of the storage-bin electronic tag is the first frequency. A unique identifier of the storage-bin can be obtained from the third signal transmitted by the storage-bin electronic tag.

In step 102, a fourth signal with a second frequency is transmitted through a second transmitting antenna, to cause each of a plurality of item electronic tags receiving the fourth signal to transmit a fifth signal with the second frequency.

In some embodiments, the second frequency is 902-928 MHz.

An electronic tag is disposed at a fixed position of an outer package of each item. The working frequency of item electronic tag is the second frequency. A unique identifier of the item can be obtained from the fifth signal transmitted by the item electronic tag.

In step 103, one of a plurality of third signals, which has a maximum signal strength, is taken as a target signal in a case where the plurality of the third signals are received through the receiving antenna.

In step 104, a storage-bin corresponding to a storage-bin electronic tag transmitting the target signal is taken as a target storage-bin, and item electronic tag information associated with the target storage-bin is extracted from an information base.

In some embodiments, the information base is provided in the robot control apparatus in advance, and the information base includes item electronic tag information of an item placed in a storage-bin.

In step 105, a inventorying result of the target storage-bin is acquired according to a plurality of pieces of tag information and the item electronic tag information in a case where the plurality of pieces of tag information transmitted by an electronic tag receiver are received, wherein the electronic tag receiver acquires the tag information from the fifth signal.

In some embodiments, in a case where the electronic tag receiver receives the fifth signal with the second frequency transmitted by each of the plurality of item electronic tags, the electronic tag receiver acquires tag information from the fifth signal and transmits the tag information to the robot.

By comparing the plurality of pieces of tag information provided by the electronic tag receiver with the item electronic tag information obtained from the information base, it is determined whether the plurality of pieces of tag information matches with the item electronic tag information, therefore the inventorying of the target storage-bin can be realized.

In step 106, the inventorying result of the target storage-bin is transmitted to the main controller.

In some embodiments, it is detected whether inventorying results of all storage-bins are obtained after transmitting the inventorying result of the target storage-bin to the main controller. The robot is driven to move along the preset path in a case where the inventorying results of all the storage-bins are not obtained, thereby inventorying to other storage-bins. The robot is driven back to a designated spot in a case where the inventorying results of all the storage-bins are obtained.

In the method for inventorying the items according to the above embodiments of the present disclosure, the robot control apparatus transmits the radio frequency signals with different frequencies to the storage-bin electronic tags and the item electronic tags by using different transmitting antennas to reduce mutual interference. The robot control apparatus performs the inventorying by using the signals transmitted by the storage-bin electronic tags and the item electronic tags, such that the cost can be effectively reduced, and the inventorying efficiency can be improved.

In some embodiments, first positioning information of the robot is acquired from the plurality of the third signals in a case where the plurality of third signals are received through the receiving antenna. Second positioning information of the robot is acquired from a positioning device. Current position information of the robot is determined according to the first positioning information and the second positioning information. The current position information is transmitted to the main controller, to cause the main controller to detect whether the robot is on the preset path.

Because the coordinate positions of the storage-bin electronic tags are known in advance, the first positioning information of the robot can be calculated according to a positioning algorithm such as A-GPS (Assisted Global Positioning System) in a case where the plurality of the third signals are received.

In some embodiments, the positioning device of the robot comprise at least one of an electromagnetic navigation positioning device, an inertial navigation positioning device, an ultrasonic navigation positioning device, a laser navigation positioning device, a visual navigation positioning device, or an UWB (Ultra wideband) positioning device. For example, the positioning device of the robot includes the inertial navigation positioning device and the ultrasonic navigation positioning device. Under a condition that the positioning device comprises an ultrasonic navigation positioning device, the robot control apparatus can also utilize ultrasonic waves to avoid obstacles.

It should be noted that, the electromagnetic navigation positioning device needs a guide cable buried underground and an auxiliary positioning facility such as a magnetic stripe stuck on the ground, which requires a large amount of work and cannot avoid obstacles. The inertial navigation positioning device has error accumulation in the positioning process, thereby causing the reduction of the positioning precision. The performance of the ultrasonic navigation positioning device is greatly influenced by a shape of a surface of an object, and it is not easy to obtain accurately position in a warehouse environment. The laser navigation positioning device has high cost and high requirements on working environments (external light, ground and visibility requirements, etc.). The visual navigation positioning device requires a large amount of calculation and the positioning accuracy is lower at longer distances. The UWB positioning device has higher cost and small positioning coverage and is largely affected by a multipath interference and co-frequency interference.

In order to solve the disadvantages of the prior art, the first positioning information of the robot obtained by using the signal transmitted by the storage-bin electronic tag is fused with the second positioning information of the robot obtained from the positioning device in the above embodiments of the present disclosure, thereby obtaining a relatively accurate current position information of the robot.

In some embodiments, an image processing device is configured to acquire images of the robot in a preset period, acquire position estimation information of the robot by analyzing the images, and transmit the position estimation information to the robot. For example, the image processing device is a computer having image capturing function and image processing function.

For example, the image processing device acquires images of the robot located in a warehouse lane, and determines the position of the robot in the warehouse lane through image analysis to obtain the position estimation information.

In this case, the robot control apparatus uses the first positioning information, the second positioning information and the position estimation information to obtain more accurate position information of the robot.

In some embodiments, the main controller is configured to detect whether the robot is on the preset path according to the position information transmitted by the robot, and transmit an adjustment instruction to the robot in a case where the robot is not on the preset path. The robot control apparatus adjusts a motion state of the robot according to an adjustment instruction after receiving the adjustment instruction transmitted by the main controller, to cause the robot to be on the preset path.

Figure 2:
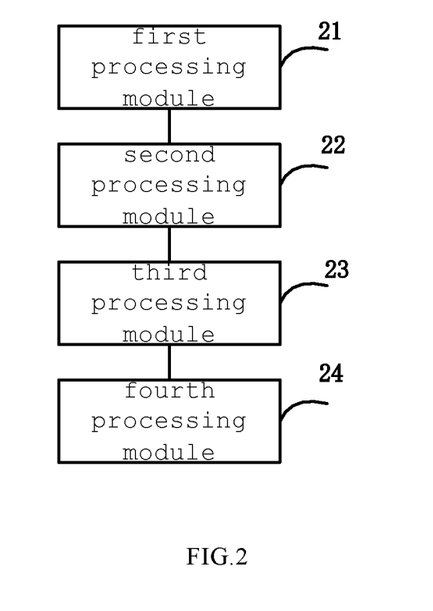
FIG. 2 is a schematic structural diagram of a robot control apparatus according to one embodiment of the present disclosure.

FIG. 2 is a schematic structural diagram of a robot control apparatus according to one embodiment of the present disclosure. As shown in FIG. 2, the robot control apparatus includes a first processing module 21, a second processing module 22, a third processing module 23, and a fourth processing module 24.

The first processing module 21 is configured to transmit a second signal with a first frequency through a first transmitting antenna in a case where a first signal with the first frequency transmitted by a main controller is received through a receiving antenna during driving a robot to move along a preset path, to cause each of a plurality of storage-bin electronic tags receiving the second signal to transmit a third signal with the first frequency, and transmit a fourth signal with a second frequency through a second transmitting antenna, to cause each of a plurality of item electronic tags receiving the fourth signal to transmit a fifth signal with the second frequency.

In some embodiments, the main controller continuously transmits the first signal with the first frequency. For example, the first frequency is 433 MHz.

Each storage-bin is provided with a storage-bin electronic tag, and the working frequency of the storage-bin electronic tag is a first frequency. A unique identifier of the storage-bin can be obtained from the third signal transmitted by the storage-bin electronic tag.

In some embodiments, the second frequency is 902-928 MHz.

An electronic tag is disposed at a fixed position of an outer package of each item. The working frequency of item electronic tag is the second frequency. A unique identifier of the item can be obtained from the fifth signal transmitted by the item electronic tag.

The second processing module 22 is configured to take one of a plurality of third signals, which has a maximum signal strength, as a target signal in a case where the plurality of the third signals are received through the receiving antenna, take a storage-bin corresponding to a storage-bin electronic tag transmitting the target signal as a target storage-bin, and extract item electronic tag information associated with the target storage-bin from an information base.

In some embodiments, the information base is provided in the robot control apparatus in advance, and the information base includes item electronic tag information of an item placed in a storage-bin.

The third processing module 23 is configured to acquire a inventorying result of the target storage-bin according to a plurality of pieces of tag information and the item electronic tag information in a case where the plurality of pieces of tag information transmitted by an electronic tag receiver are received, wherein the electronic tag receiver acquires the tag information from the fifth signal.

In some embodiments, in a case where the electronic tag receiver receives the fifth signal with the second frequency transmitted by each of the plurality of item electronic tags, the electronic tag receiver acquires tag information from the fifth signal and transmits the tag information to the robot.

By comparing the plurality of pieces of tag information provided by the electronic tag receiver with the item electronic tag information obtained from the information base, it is determined whether the plurality of pieces of tag information matches with the item electronic tag information, therefore the inventorying of the target storage-bin can be realized.

The fourth processing module 24 is configured to transmit the inventorying result of the target storage-bin to the main controller.

In some embodiments, after transmitting the inventorying result of the target storage-bin to the main controller, the fourth processing module 24 further detects whether inventorying results of all storage-bins are obtained. The fourth processing module 24 drives the robot to move along the preset path in a case where the inventorying results of all the storage-bins are not obtained, and drives the robot back to a designated spot in a case where the inventorying results of all the storage-bins are obtained.

Figure 3:
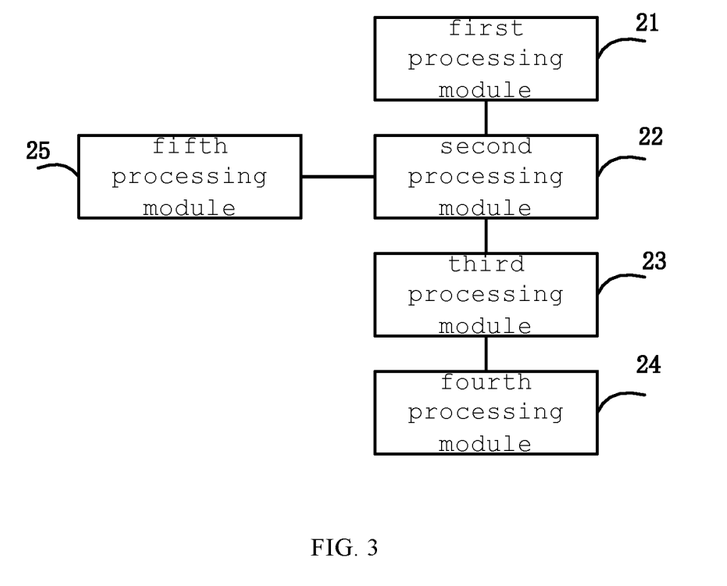
FIG. 3 is a schematic structural diagram of a robot control apparatus according to another embodiment of the present disclosure.

FIG. 3 is a schematic structural diagram of a robot control apparatus according to another embodiment of the present disclosure. FIG. 3 differs from FIG. 2 in that in the embodiment shown in FIG. 3, the robot control apparatus further comprises a fifth processing module 25.

In some embodiments, the fifth processing module 25 acquires first positioning information of the robot from the plurality of the third signals in a case where the plurality of third signals are received through the receiving antenna, acquires second positioning information of the robot from a positioning device, determines current position information of the robot according to the first positioning information and the second positioning information, and transmits the current position information to the main controller, to cause the main controller to detect whether the robot is on the preset path.

In some embodiments, the fifth processing module 25 receives position estimation information of the robot provided by the image processing device and determines the current position information of the robot according to the first positioning information, the second positioning information, and the position estimation information.

In some embodiments, the main controller is configured to detect whether the robot is on the preset path according to the position information transmitted by the robot, and transmit an adjustment instruction to the robot in a case where the robot is not on the preset path. The fifth processing module 25 adjusts a motion state of the robot according to an adjustment instruction after receiving the adjustment instruction transmitted by the main controller, to cause the robot to be on the preset path.

Figure 4:
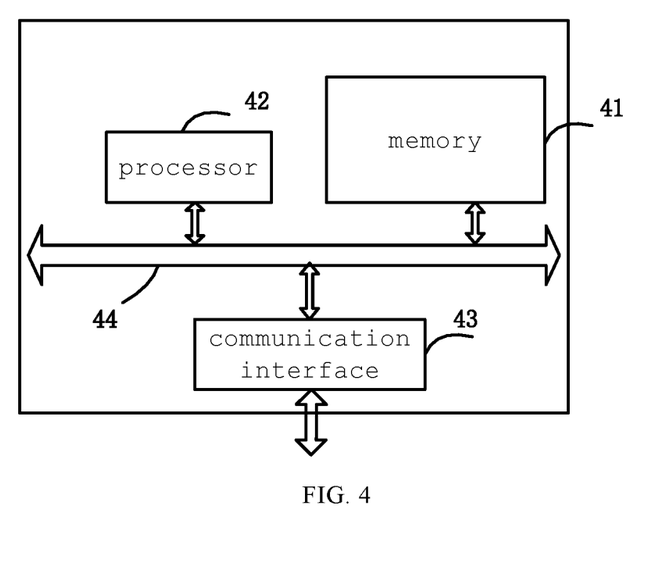
FIG. 4 is a schematic structural diagram of a robot control apparatus according to still another embodiment of the present disclosure.

FIG. 4 is a schematic structural diagram of a robot control apparatus according to another embodiment of the present disclosure. As shown in FIG. 4, the robot control apparatus includes a memory 41 and a processor 42.

The memory 41 is used for storing instructions, the processor 42 is coupled to the memory 41, and the processor 42 is configured to implement the method in any of the embodiments in FIG. 1 based on the instructions stored in the memory.

As shown in FIG. 4, a robot control apparatus further includes a communication interface 43 for information interaction with other devices. Meanwhile, the robot control apparatus further comprises a bus 44 through which the processor 42, the communication interface 43 and the memory 41 are communicated with each other.

The memory 41 may comprise high-speed RAM memory, and may also include non-volatile memory, such as at least one disk memory. The memory 41 may also be a memory array. The storage 41 may also be partitioned into blocks which can be combined into virtual volumes according to certain rules.

Further, the processor 42 may be a central processing unit CPU, or may be an application specific integrated circuit ASIC, or one or more integrated circuits configured to implement embodiments of the present disclosure.

The present disclosure also relates to a computer-readable storage medium, in which computer instructions are stored, and when executed by a processor, the instructions implement the method according to any one of the embodiments in FIG. 1.

Figure 5A:
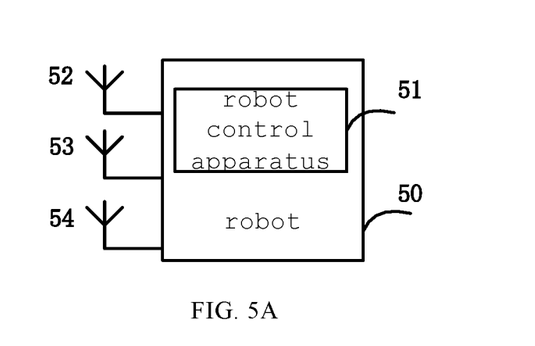
FIG. 5A and FIG. 5B are schematic structural diagrams of a robot according to some embodiments of the present disclosure.

FIG. 5A is a schematic structural diagram of a robot according to one embodiment of the present disclosure. As shown in FIG. 5A, the robot 50 includes a robot control apparatus 51, a receiving antenna 52, a first transmitting antenna 53, and a second transmitting antenna 54. The robot control apparatus 51 is a robot control apparatus concerned in any of the embodiments in FIGS. 2 to 4.

The receiving antenna 52 is configured to receive a first signal with a first frequency transmitted by the main controller, and is further configured to receive a third signal with the first frequency transmitted by the storage-bin electronic tag.

The first transmitting antenna 53 is configured to transmit a second signal with a first frequency.

The second transmit antenna 54 is configured to transmit a fourth signal with the second frequency.

For example, the first frequency is 433 MHz. The second frequency is 902-928 MHz.

Figure 5B:
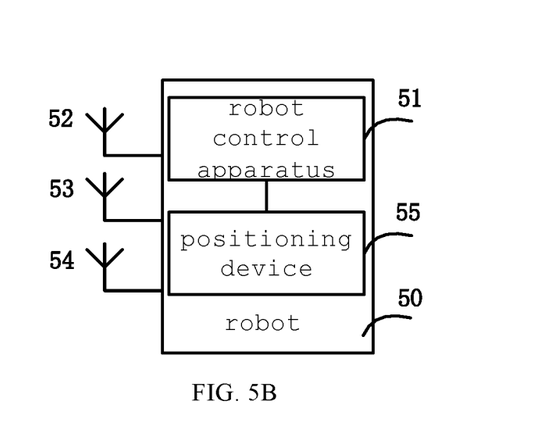

FIG. 5B is a schematic structural diagram of a robot according to another embodiment of the present disclosure. FIG. 5B differs FIG. 5A in that in the embodiment shown in FIG. 5B, the robot comprises a positioning device 55. The positioning device 55 is configured to provide positioning information of the robot to the robot control apparatus 51.

In some embodiments, the positioning device of the robot comprise at least one of an electromagnetic navigation positioning device, an inertial navigation positioning device, an ultrasonic navigation positioning device, a laser navigation positioning device, a visual navigation positioning device, or an UWB (Ultra wideband) positioning device.

Figure 6:
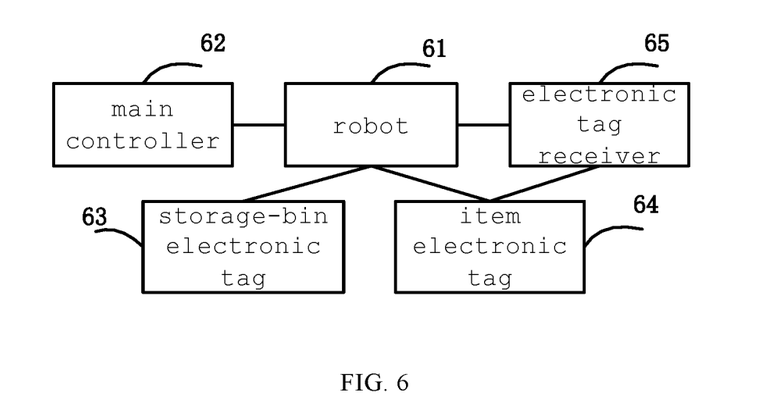
FIG. 6 is a schematic structural diagram of a system for inventorying items according to one embodiment of the present disclosure.

FIG. 6 is a schematic structural diagram of a system for inventorying the items according to one embodiment of the present disclosure. As shown in FIG. 6, the system for inventorying the items includes a robot 61, a main controller 62, a storage-bin electronic tag 63, an item electronic tag 64 and an electronic tag receiver 65. The robot 61 is a robot according to any one of the embodiments of FIG. 5A and FIG. 5B.

It should be noted that, for the sake of simplicity, only one storage-bin electronic tag 63 and one item electronic tag 64 are shown in FIG. 6. In practice, the system for inventorying the items includes a plurality of storage-bin electronic tags 63 and a plurality of item electronic tags 64.

The main controller 62 is configured to continuously transmit the first signal with the first frequency, and is further configured to receive an inventorying result transmitted by the robot 61.

For example, the first frequency is 433 MHz.

The storage-bin electronic tag 63 is configured to transmit the third signal with the first frequency when receiving the second signal with the first frequency transmitted by the robot 61.

The item electronic tag 64 is configured to transmit the fifth signal with the second frequency when receiving the fourth signal having the second frequency transmitted by the robot 61.

The electronic tag receiver 65 is configured to receive the fifth signal with the second frequency transmitted by the item electronic tag 64, acquire tag information from the fifth signal, and transmit the tag information to the robot 61.

Figure 7:
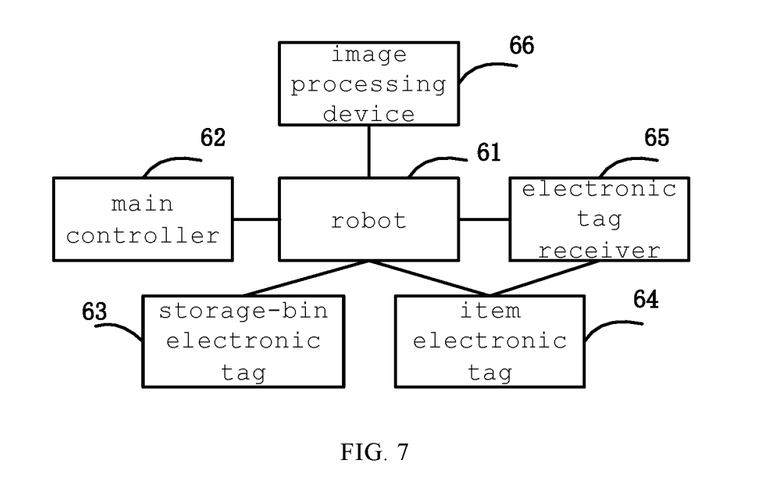
FIG. 7 is a schematic structural diagram of a system for inventorying items according to another embodiment of the present disclosure.

FIG. 7 is a schematic structural diagram of a system for inventorying the items according to another embodiment of the disclosure. FIG. 7 differs from FIG. 6 in that in the embodiment shown in FIG. 7, the system for inventorying the items further comprises an image processing device 66.

The image processing device 66 is configured to acquire images of the robot in a preset period, acquire position estimation information of the robot by analyzing the images, and transmit the position estimation information to the robot 61.

In some embodiments, the main controller 62 is further configured to detect whether the robot 61 is on the preset path according to the position information transmitted by the robot, and transmit an adjustment instruction to the robot 61 in a case where the robot is not on the preset path, therefore the robot 61 adjusts the motion state according to the adjustment instruction, to cause the robot 61 to be on the preset path.

Figure 8:
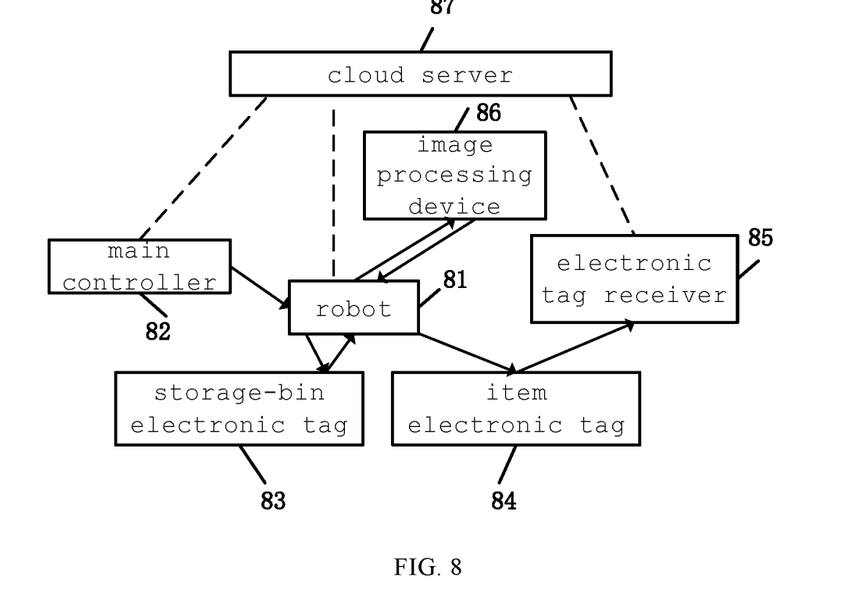
FIG. 8 is a schematic structural diagram of a system for inventorying items according to still another embodiment of the present disclosure.

FIG. 8 is a schematic structural diagram of a system for inventorying the items according to still another embodiment of the present disclosure. It should be noted that, for the sake of simplicity, only one storage-bin electronic tag 83 and one item electronic tag 84 are shown in FIG. 8. In practice, the system for inventorying the items includes a plurality of storage-bin electronic tags 63 and a plurality of item electronic tags 84.

As shown in FIG. 8, the main controller 82 continuously transmits the first signal with the first frequency of 433 MHz. In the process that the robot 81 moves along the preset path, the robot 81 transmits the second signal with the first frequency through the first transmitting antenna in a case where the first signal with the first frequency transmitted by the main controller 82 is received by the receiving antenna, and transmits the fourth signal with the second frequency of 902-928 MHz through the second transmitting antenna.

The plurality of storage-bin electronic tags 83 which have received the second signal transmit the third signal with the first frequency. The plurality of item electronic tags 84 which have received the fourth signal transmit the fifth signal with the second frequency.

The robot 81 takes one of the plurality of third signals, which has the maximum signal strength, as a target signal in a case where the robot 81 receives the plurality of third signals transmitted by the plurality of storage-bin electronic tags 83 through the receiving antenna, takes a storage-bin corresponding to a storage-bin electronic tag transmitting the target signal as a target storage-bin, and extracts item electronic tag information associated with the target storage-bin from the information base.

Upon receiving the fifth signal transmitted by the item electronic tag 84, the electronic tag receiver 85 acquires the tag information from the fifth signal, and transmits the tag information to the robot 81.

After receiving the plurality of pieces of tag information transmitted by the electronic tag receiver 85, the robot 81 acquires the inventorying result of the target storage-bin according to the plurality of pieces of tag information and the item electronic tag information, and transmits the inventorying result of the target storage-bin to the main controller 82 through a cloud server 87.

After transmitting the inventorying result of the target storage-bin to the main controller 82, the robot 81 further detects whether the inventorying results of all storage-bins have been obtained. The robot 11 is continuously moves along the preset path in a case where the inventorying results of all the storage-bins are not obtained, to check other storage-bins. The robot 11 returns back to the designated spot in a case where the inventorying results of all the storage-bins are obtained.

In some embodiments, the image processing device 86 acquires images of the robot in a preset period, acquires position estimation information by analyzing the images, and transmits the position estimation information to the robot 81 through the cloud server 87.

Upon receiving a plurality of third signals transmitted by the plurality of storage-bin electronic tags 83 through the receiving antenna, the robot 81 acquires the first positioning information of the robot 81 according to the plurality of third signals. Further, the robot 81 acquires the second positioning information of the robot 81 from the positioning device, therefore the robot 81 acquires the current position information of the robot 81 according to the first positioning information, the second positioning information, and the position estimation information. The robot 81 transmits the current position information to the main controller 82 through cloud server 87.

The main controller 82 detects whether the robot 81 is on the preset path according to the position information transmitted by the robot 81. If the robot 81 is not on the preset path, the main controller 82 transmits an adjustment instruction to the robot 81 through the cloud server 87, such that the robot 81 adjusts the motion state according to the adjustment instruction, to cause the robot 81 to be on the preset path.

In some embodiments, the functional unit modules described above can be implemented as a general purpose processor, a programmable logic controller (PLC), a digital signal processor (DSP), an application specific integrated circuit (ASIC), a field programmable gate array (FPGA) or other programmable logic devices, discrete gates or transistor logics, discrete hardware components, or any suitable combination thereof for performing the functions described in this disclosure.

It will be understood by those skilled in the art that all or part of the steps for implementing the above embodiments may be implemented by hardware, or may be implemented by a program instructing relevant hardware, where the program may be stored in a computer-readable storage medium, and the storage medium may be a read-only memory, a magnetic disk or an optical disk.

The description of the present disclosure has been presented for purposes of illustration and description, and is not intended to be exhaustive or limited to the disclosure in the form disclosed. Many modifications and variations are obvious to practitioners skilled in this art. The embodiment was chosen and described in order to best explain the principles and the practical applications of the disclosure, and to enable those of ordinary skill in the art to understand the disclosure for various embodiments with various modifications as are suited to the particular use contemplated.

What is claimed is:

1. A method for inventorying items performed by a robot control apparatus, the method comprising:
   transmitting a second signal with a first frequency through a first transmitting antenna in a case where a first signal with the first frequency transmitted by a main controller is received through a receiving antenna during driving a robot to move along a preset path, to cause each of a plurality of storage-bin electronic tags receiving the second signal to transmit a third signal with the first frequency;
   transmitting a fourth signal with a second frequency through a second transmitting antenna, to cause each of a plurality of item electronic tags receiving the fourth signal to transmit a fifth signal with the second frequency;
   taking one of a plurality of third signals, which has a maximum signal strength, as a target signal in a case where the plurality of the third signals are received through the receiving antenna;
   taking a storage-bin corresponding to a storage-bin electronic tag transmitting the target signal as a target storage-bin, and extracting item electronic tag information associated with the target storage-bin from an information base;
   acquiring an inventorying result of the target storage-bin according to a plurality of pieces of tag information and the item electronic tag information in a case where the plurality of pieces of tag information transmitted by an electronic tag receiver are received, wherein the electronic tag receiver acquires the tag information from the fifth signal;
   transmitting the inventorying result of the target storage-bin to the main controller;
   acquiring first positioning information of the robot from the plurality of the third signals in a case where the plurality of third signals are received through the receiving antenna;
   acquiring second positioning information of the robot from a positioning device;
   receiving position estimation information of the robot provided by an image processing device, wherein the image processing device collects images of the robot in a preset period, and analyzes the images to obtain the position estimation information;
   determining the current position information of the robot according to the first positioning information, the second positioning information, and the position estimation information;
   transmitting the current position information to the main controller, to cause the main controller to detect whether the robot is on the preset path;
   detecting whether inventorying results of all storage-bins are obtained after transmitting the inventorying result of the target storage-bin to the main controller;

driving the robot to move along the preset path in a case where the inventorying results of all the storage-bins are not obtained; and driving the robot back to a designated spot in a case where the inventorying results of all the storage-bins are obtained.

2. The method for inventorying the items according to claim 1, further comprising: adjusting a motion state of the robot according to an adjustment instruction after receiving the adjustment instruction transmitted by the main controller, to cause the robot to be on the preset path.

3. A robot control apparatus comprising:
a memory; and
a processor coupled to the memory, which is configured to execute the method for inventorying the items comprising:
transmitting a second signal with a first frequency through a first transmitting antenna in a case where a first signal with the first frequency transmitted by a main controller is received through a receiving antenna during driving a robot to move along a preset path, to cause each of a plurality of storage-bin electronic tags receiving the second signal to transmit a third signal with the first frequency;
transmitting a fourth signal with a second frequency through a second transmitting antenna, to cause each of a plurality of item electronic tags receiving the fourth signal to transmit a fifth signal with the second frequency;
taking one of a plurality of third signals, which has a maximum signal strength, as a target signal in a case where the plurality of the third signals are received through the receiving antenna;
taking a storage-bin corresponding to a storage-bin electronic tag transmitting the target signal as a target storage-bin, and extracting item electronic tag information associated with the target storage-bin from an information base;
acquiring an inventorying result of the target storage-bin according to a plurality of pieces of tag information and the item electronic tag information in a case where the plurality of pieces of tag information transmitted by an electronic tag receiver are received, wherein the electronic tag receiver acquires the tag information from the fifth signal;
transmitting the inventorying result of the target storage-bin to the main controller;
acquiring first positioning information of the robot from the plurality of the third signals in a case where the plurality of third signals are received through the receiving antenna;
acquiring second positioning information of the robot from a positioning device;
receiving position estimation information of the robot provided by an image processing device, wherein the image processing device collects images of the robot in a preset period, and analyzes the images to obtain the position estimation information;
determining the current position information of the robot according to the first positioning information, the second positioning information, and the position estimation information;
transmitting the current position information to the main controller, to cause the main controller to detect whether the robot is on the preset path;

detecting whether inventorying results of all storage-bins are obtained after transmitting the inventorying result of the target storage-bin to the main controller;
driving the robot to move along the preset path in a case where the inventorying results of all the storage-bins are not obtained; and
driving the robot back to a designated spot in a case where the inventorying results of all the storage-bins are obtained.

4. A robot, comprising:
a robot control apparatus, comprising:
a memory; and
a processor coupled to the memory, which is configured to execute the method for inventorying the items comprising:
transmitting a second signal with a first frequency through a first transmitting antenna in a case where a first signal with the first frequency transmitted by a main controller is received through a receiving antenna during driving a robot to move along a preset path, to cause each of a plurality of storage-bin electronic tags receiving the second signal to transmit a third signal with the first frequency;
transmitting a fourth signal with a second frequency through a second transmitting antenna, to cause each of a plurality of item electronic tags receiving the fourth signal to transmit a fifth signal with the second frequency;
taking one of a plurality of third signals, which has a maximum signal strength, as a target signal in a case where the plurality of the third signals are received through the receiving antenna;
taking a storage-bin corresponding to a storage-bin electronic tag transmitting the target signal as a target storage-bin, and extracting item electronic tag information associated with the target storage-bin from an information base;
acquiring an inventorying result of the target storage-bin according to a plurality of pieces of tag information and the item electronic tag information in a case where the plurality of pieces of tag information transmitted by an electronic tag receiver are received, wherein the electronic tag receiver acquires the tag information from the fifth signal;
transmitting the inventorying result of the target storage-bin to the main controller;
acquiring first positioning information of the robot from the plurality of the third signals in a case where the plurality of third signals are received through the receiving antenna;
acquiring second positioning information of the robot from a positioning device;
receiving position estimation information of the robot provided by an image processing device, wherein the image processing device collects images of the robot in a preset period, and analyzes the images to obtain the position estimation information;
determining the current position information of the robot according to the first positioning information, the second positioning information, and the position estimation information;
transmitting the current position information to the main controller, to cause the main controller to detect whether the robot is on the preset path;
detecting whether inventorying results of all storage-bins are obtained after transmitting the inventorying result of the target storage-bin to the main controller;

driving the robot to move along the preset path in a case where the inventorying results of all the storage-bins are not obtained; and driving the robot back to a designated spot in a case where the inventorying results of all the storage-bins are obtained;

a receiving antenna, configured to receive a first signal with a first frequency transmitted by a main controller, and receive a third signal with the first frequency transmitted by a storage-bin electronic tag;

a first transmitting antenna, configured to transmit a second signal with the first frequency; and a second transmitting antenna, configured to transmit a fourth signal with a second frequency.

5. A system for inventorying items, comprising:

the robot of claim 4;

a main controller, configured to continuously transmit a first signal with a first frequency and receive an inventorying result transmitted by the robot;

a storage-bin electronic tag, configured to transmit a third signal with the first frequency in a case where a second signal with the first frequency is received;

an item electronic tag, configured to transmit a fifth signal with a second frequency in a case where a fourth signal with the second frequency is received; and an electronic tag receiver, configured to receive a fifth signal with the second frequency, acquire tag information from the fifth signal, and transmit the tag information to the robot.

6. The system for inventorying the items according to claim 5, further comprising:

an image processing device, configured to acquire images of the robot in a preset period, acquire position estimation information of the robot by analyzing the images, and transmit the position estimation information to the robot.

7. The system for inventorying the items according to claim 5, wherein the main controller is further configured to detect whether the robot is on the preset path according to the position information transmitted by the robot, and transmit an adjustment instruction to the robot in a case where the robot is not on the preset path.

8. A non-transitory computer readable storage medium, which stores a computer program that, when executed by a processor, performs the method for inventorying the items according to claim 1.

9. The robot control apparatus according to claim 3, the method further comprising:

acquiring first positioning information of the robot from the plurality of the third signals in a case where the plurality of third signals are received through the receiving antenna;

acquiring second positioning information of the robot from a positioning device;

determining current position information of the robot according to the first positioning information and the second positioning information; and transmitting the current position information to the main controller, to cause the main controller to detect whether the robot is on the preset path.

10. The robot control apparatus according to claim 9, the method further comprising:

receiving position estimation information of the robot provided by an image processing device, wherein the image processing device collects images of the robot in a preset period, and analyzes the images to obtain the position estimation information; and the determining the current position information of the robot according to the first positioning information and the second positioning information comprises:

determining the current position information of the robot according to the first positioning information, the second positioning information, and the position estimation information.

11. The robot control apparatus according to claim 9, the method further comprising:

adjusting a motion state of the robot according to an adjustment instruction after receiving the adjustment instruction transmitted by the main controller, to cause the robot to be on the preset path.

12. The robot control apparatus according to claim 3, the method further comprising:

detecting whether inventorying results of all storage-bins are obtained after transmitting the inventorying result of the target storage-bin to the main controller;

driving the robot to move along the preset path in a case where the inventorying results of all the storage-bins are not obtained; and driving the robot back to a designated spot in a case where the inventorying results of all the storage-bins are obtained.

13. The robot according to claim 4, further comprising:

a positioning device, configured to provide positioning information of the robot to the robot control apparatus.

14. The robot according to claim 4, the method further comprising:

acquiring first positioning information of the robot from the plurality of the third signals in a case where the plurality of third signals are received through the receiving antenna;

acquiring second positioning information of the robot from a positioning device;

determining current position information of the robot according to the first positioning information and the second positioning information; and transmitting the current position information to the main controller, to cause the main controller to detect whether the robot is on the preset path.

15. The robot according to claim 14, the method further comprising:

receiving position estimation information of the robot provided by an image processing device, wherein the image processing device collects images of the robot in a preset period, and analyzes the images to obtain the position estimation information; and the determining the current position information of the robot according to the first positioning information and the second positioning information comprises:

determining the current position information of the robot according to the first positioning information, the second positioning information, and the position estimation information.

16. The robot according to claim 14, the method further comprising:

adjusting a motion state of the robot according to an adjustment instruction after receiving the adjustment instruction transmitted by the main controller, to cause the robot to be on the preset path.

17. The robot according to claim 4, the method further comprising:
- detecting whether inventorying results of all storage-bins are obtained after transmitting the inventorying result of the target storage-bin to the main controller;
- driving the robot to move along the preset path in a case where the inventorying results of all the storage-bins are not obtained; and
- driving the robot back to a designated spot in a case where the inventorying results of all the storage-bins are obtained.

* * * * *